Dec. 13, 1966     E. C. GIONTA     3,291,416
RETRACTING DEVICE
Filed Dec. 24, 1964
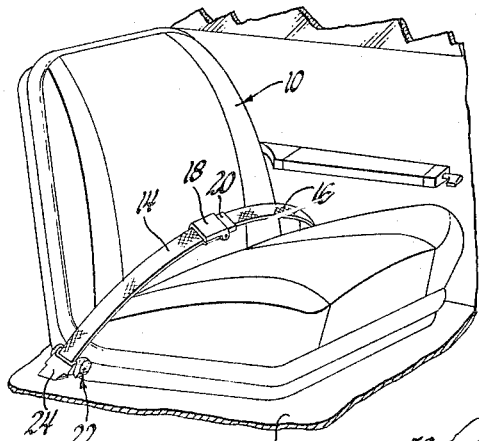
Fig.1
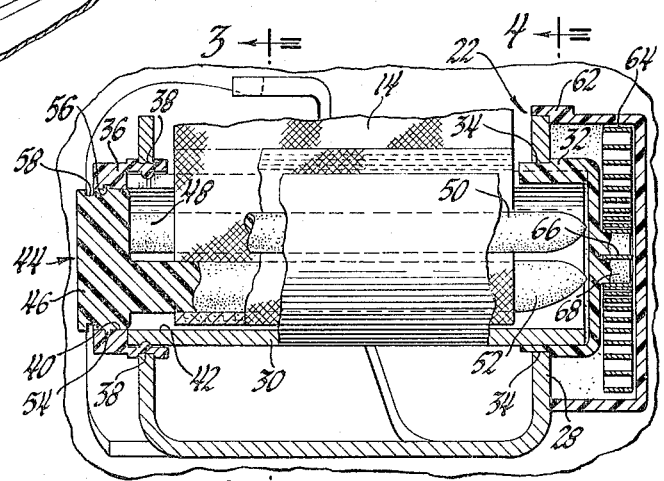
Fig.2
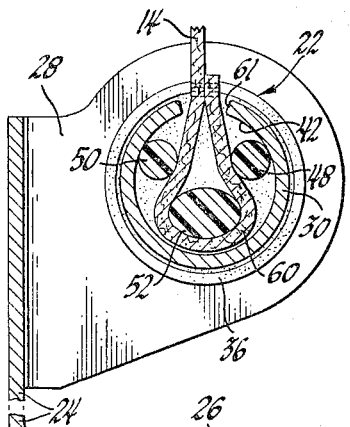
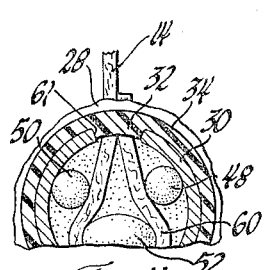
Fig.3.
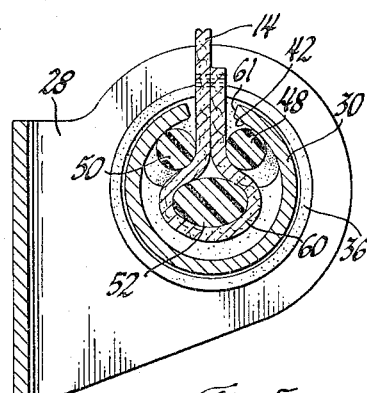
Fig.4
Fig.5
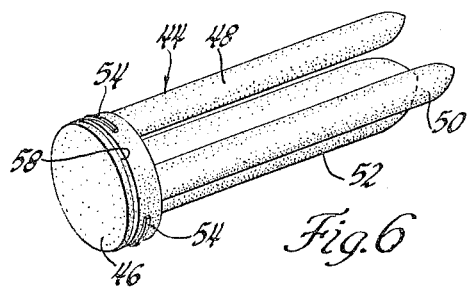
Fig.6
INVENTOR.
Edward C. Gionta
BY
Hugh L. Fisher
ATTORNEY United States Patent Office 3,291,416
Patented Dec. 13, 1966

3,291,416
RETRACTING DEVICE
Edward C. Gionta, Bristol, Conn., assignor to General Motors Corporation, Detroit, Mich., a corporation of Delaware
Filed Dec. 24, 1964, Ser. No. 420,905
6 Claims. (Cl. 242—107)

This invention relates to retracting revices and more particularly to a seat belt retractor including an improved seat belt retaining member for securing one end of the belt to the retractor.

In the prior art seat belt retractors, several approaches have been taken regarding the manner in which the seat belt is secured to the retractor. Generally, the fixed end of the belt is coupled to a drum or rotatable element of the retractor by a pin such that the belt and rectractor form an integral unit. A modified arrangement provides that a keying member form an integral part of the belt webbing with the keying member cooperating with the drum to secure the belt thereto. Both arrangements require removal of the drum if replacement of the belt is necessary and also require assembly of the belt and drum prior to mounting of the drum.

The present invention obviates the disadvantages of the prior art by providing an improved belt retaining member which allows ease and flexibility of assembly and quick replacement of the seat belt if necessary. The retaining member includes three flexible fingers extending from a common base which are adapted to be inserted in one end of the drum. The seat belt is provided with a loop at one end which extends through an elongated slot in the drum and between two of the fingers and receives the third finger. Thus, when a tensioning force is applied to the belt, it is wedged between two of the fingers, which engage the inner surface of the drum, and the third finger. The three fingers are formed of a plastic material and provide a smooth surface for engagement with the belt and therefore tend to prevent fraying or cutting of the belt when a heavy load is applied. Should the need arise to replace the belt, the retaining member may be removed from the retractor permitting replacement of the belt without disassembly of the entire retractor.

A more completed understanding of the present invention may be had from the following detailed description which should be read in conjunction with the drawings in which:

FIGURE 1 is a perspective view showing a seat belt assembly utilizing the retractor of the present invention and mounted in a motor vehicle;

FIGURE 2 is a sectional view of the retractor of the present invention;

FIGURE 3 is a sectional view taken along lines 3—3 of FIGURE 2 with the seat belt in a relaxed condition;

FIGURE 4 is a sectional view taken along lines 4—4 of FIGURE 2;

FIGURE 5 is a sectional view similar to FIGURE 3 showing the seat belt with a tensioning force applied;

FIGURE 6 is a perspective view of the seat belt retaining member of the present invention.

Referring now to the drawings and initially to FIGURE 1, a seat generally designated 10 is shown mounted on the floor 12 of a motor vehicle. A seat belt assembly including a pair of seat belt portions 14 and 16 are arranged to extend around the seat 10 and are provided at one end with cooperating buckle parts 18 and 20. The other end of the belt portions 14 and 16 are secured to a retracting device generally designated 22 which in turn is secured to the floor 12 on each side of the seat 10.

Referring now to FIGURES 2-6 the retracting device 22 includes a mounting bracket 24 which has an angled portion 26 and a U-shaped portion 28. The portion 26 is secured to the floor 12 of the vehicle and the portion 28 supports a rotatable hollow drum 30. One end of the drum 30 is provided with a plastic journal 32 which is received in a bearing 34 formed in the bracket 28. The other end of the drum 30 is adapted to receive a second plastic journal 36 which is received in a bearing 38 formed in the bracket 28.

The journal 36 is provided with an opening 40 aligned with the inner surface 42 of the drum 30 for receiving a belt retaining member generally designated 44 which is formed of a plastic material. The retaining member 44 includes a base member 46 provided with integrally formed flexible fingers 48, 50 and 52. The base 46 is provided with an embossment 54 adapted to engage a recess 56 in the opening 40 when the member 44 is inserted in the drum 30 to provide a detachable connection. The base 46 is also provided with an annular indentation 58 suitable for receiving a tool whereby the member 44 may be removed from the drum 30 if replacement of the seat belt is necessary. The fingers 48, 50 and 52 extend substantially through the drum 30 with the fingers 48 and 50 engaging the inner surface 42 of the drum 30 as shown in FIGURE 3. A loop 60 formed at one end of the belt portion 14 extends through an elongated slot 61 in the drum 30 and between the fingers 48 and 50 and receives the finger 52. The fingers 48 and 50 are circular in cross section and have substantially the same cross sectional area, while the finger 52 is elliptical in cross section and is of substantially greater cross sectional area than the fingers 48 and 50.

It is apparent from the drawings that the combined diameters of the fingers 48, 50 and 52 are greater than the internal diameter of the drum 30. Therefore, when a tensioning force is applied to the belt 14 as depicted in FIGURE 5, the finger 52 is drawn upwardly and wedges the belt portion 14 between the three fingers 48, 50 and 52 with the fingers 48 and 50 being driven upwardly along the inner surface 42 of the drum 30. Thus, the fingers 48, 50 and 52 cooperate with the inner surface 42 of the drum 30 to secure the loop end of the belt portion 14 to the drum 30 while allowing easy replacement of the belt should this prove necessary; and since the wedging force is applied through the fingers 48, 50 and 52 rather than the belt directly contacting the edges of the slot 61, there is little possibility of fraying or cutting of the belt.

A hollow enclosure 62 is secured to the portion 28 of the bracket 24 and houses a spirally-wound power spring 64 having one end received in a slot 66 formed in an axially extension 68 of the journal 32. The other end of the spring 64 is secured to the enclosure 62. The spring 64 is arranged with respect to the drum 30 so that as the drum is rotated counterclockwise as viewed from FIGURE 3 and the belt portion 14 is reeled off of the drum 30, the energy in the power spring 64 is increased. When the restraining force is removed from the belt portion 14, the spring acts to rotate the drum 30 in a clockwise direction and thus rewinds the belt onto the drum 30. The power spring 64 is a constant tension spring which maintains a nearly constant tension force on the belt portion 14 as it is unwound from the drum 30.

While the invention has been described with regard to a preferred embodiment thereof, this should not be construed in a limiting sense. Modifications and variations will now occur to those skilled in the art. For a definition of the invention, reference should be made to the appended claims.

I claim:
1. A retracting device comprising support means, a drum rotatably supported by said support means and including a passageway for receiving one end of a tension element, retaining means mounted within said drum and including three flexible prongs extending from a common base, said tension element having a loop formed on said one end and extending between two of said prongs and around the other prong whereby said tension element is securely coupled to said drum, spring means normally yieldingly urging said drum in a direction to wind said tension element thereon.

2. In a seat belt retractor having a rotatable drum for receiving a seat belt and upon which the seat belt is to be wound, seat belt retaining means adapted to be inserted into one end of said drum and including three flexible fingers extending from a common base member, said seat belt extending between two of said fingers and forming a loop surrounding said third finger whereby upon application of a tensioning force to said seat belt, the seat belt is wedged between said three fingers to prevent withdrawal of said seat belt from said drum.

3. In a seat belt retractor having a rotatable drum for receiving a seat belt and including means for rotating the drum in a direction to wind the seat belt thereon, seat belt retaining means adapted to be inserted into one end of said drum and including three flexible fingers extending from a common base member, the combined diameters of said fingers being greater than the internal diameter of said drum, said seat belt extending between two of said fingers and having a loop formed in one end for receiving the other finger whereby upon application of a tensioning force to said seat belt, the seat belt is wedged between said three fingers to prevent withdrawal of said seat belt from said drum.

4. A seat belt retaining member for coupling a seat belt to a rotatable drum, said drum having an elongated slot sufficient to receive one end of said belt, said retaining member adapted to be inserted into one end of said drum and including a base member having three integrally formed flexible fingers projecting therefrom, said seat belt extending between two of said fingers and surrounding the third finger with the combined diameters of said fingers being greater than the internal diameter of said drum.

5. A seat belt retractor comprising a bracket member adapted to be secured to the floor of a motor vehicle, said bracket member including a U-shaped portion, a drum having a pair of journals at opposite ends thereof rotatably mounting said drum in said U-shaped portion, a spring housing secured to said U-shaped portion and including spring means having one end thereof secured to said housing and the other end thereof secured to one of said journals and normally yieldingly urging said drum in a retracting direction, the other of said journals having an opening therein for detachably receiving a seat belt retaining member, said retaining member including a base portion having three integrally formed flexible fingers projecting therefrom and substantially through said drum, said drum including an elongated slot therein for receiving one end of a seat belt, said seat belt having a loop formed in said one end which extends between two of said fingers and surrounds the other finger, the combined diameters of said fingers being greater than the internal diameter of said drum whereby when a tensioning force is applied to said belt, the belt is wedged between said three fingers to prevent withdrawal from said drum.

6. The retractor defined by claim 5 wherein said two of said fingers have a substantially circular cross section and said other finger has a substantially elliptical cross section.

References Cited by the Examiner
UNITED STATES PATENTS

| | | | |
|---|---|---|---|
| 2,652,918 | 9/1953 | Lippert | 242—74 X |
| 3,214,218 | 10/1965 | Gill | 242—107.4 X |

FRANK J. COHEN, *Primary Examiner.*

W. S. BURDEN, *Assistant Examiner.*